(12) United States Patent
Newhouse et al.

(10) Patent No.: US 9,290,351 B2
(45) Date of Patent: Mar. 22, 2016

(54) CONTACT NIP ROLL

(75) Inventors: Kevin B. Newhouse, Houlton, WI (US);
Bruce E. Tait, Woodbury, MN (US);
Waldo L. Lopez, Maplewood, MN (US)

(73) Assignee: 3M Innovative Properties Company,
St. Paul, MN (US)

( * ) Notice: Subject to any disclaimer, the term of this patent is extended or adjusted under 35 U.S.C. 154(b) by 516 days.

(21) Appl. No.: 13/500,644

(22) PCT Filed: Oct. 12, 2010

(86) PCT No.: PCT/US2010/052213
§ 371 (c)(1),
(2), (4) Date: Apr. 6, 2012

(87) PCT Pub. No.: WO2011/046885
PCT Pub. Date: Apr. 21, 2011

(65) Prior Publication Data
US 2012/0199627 A1    Aug. 9, 2012

Related U.S. Application Data

(60) Provisional application No. 61/251,106, filed on Oct. 13, 2009.

(51) Int. Cl.
*B65H 27/00*    (2006.01)
*B65H 20/02*    (2006.01)
*F16C 13/00*    (2006.01)

(52) U.S. Cl.
CPC ............. *B65H 27/00* (2013.01); *B65H 20/02* (2013.01); *F16C 13/00* (2013.01); *B65H 2404/135* (2013.01); *B65H 2404/1316* (2013.01); *B65H 2404/1321* (2013.01)

(58) Field of Classification Search
CPC . F16C 13/00; F16C 2322/12; G03G 15/0233; G03G 15/0818; G03G 2215/025; G03G 2215/2058–2215/2067; G03G 2215/00683; G03G 15/2057; Y10T 29/49544; Y10T 29/49547; Y10T 29/49549
USPC ........................ 492/26, 20, 28, 47, 49, 53, 56
See application file for complete search history.

(56) References Cited

U.S. PATENT DOCUMENTS

| | | | |
|---|---|---|---|
| 2,287,768 | A | 6/1942 | Eckstein |
| 3,328,866 | A | 7/1967 | Robertson |
| 3,572,570 | A | 3/1971 | Mortensen |
| 3,618,190 | A | 11/1971 | Vernazza |
| 3,729,788 | A | 5/1973 | Tawa |
| 3,750,246 | A | 8/1973 | Pessen |
| 4,178,200 | A | 12/1979 | Hakert |
| 4,319,390 | A | 3/1982 | Wolf |

(Continued)

FOREIGN PATENT DOCUMENTS

| | | |
|---|---|---|
| DE | 3700596 | 7/1988 |
| DE | 4125620 | 2/1993 |

(Continued)

*Primary Examiner* — Christopher Besler
(74) *Attorney, Agent, or Firm* — Yen T. Florczak (57) ABSTRACT

An improved contact nip roll, a method for assembling an improved contact nip roll, a system for nipping a web, and a method for nipping a web are provided. The improved contact nip roll integrates an inner softer core that can provide compliancy to web caliper variations, while rigid annular rings and a harder outer skin can maintain a uniform contact area.

30 Claims, 7 Drawing Sheets

(56) References Cited

U.S. PATENT DOCUMENTS

| | | | |
|---|---|---|---|
| 4,425,694 A | 1/1984 | Somerville | |
| 4,496,257 A | 1/1985 | Habelt | |
| 4,583,966 A | 4/1986 | Ocker | |
| 4,604,778 A | 8/1986 | Edwards | |
| 4,823,689 A | 4/1989 | Kishino | |
| 5,214,239 A | 5/1993 | Koga | |
| 5,530,536 A | 6/1996 | Henry | |
| 5,679,107 A | 10/1997 | Autrata | |
| 5,759,141 A | 6/1998 | Schmitz | |
| 5,766,120 A | 6/1998 | Schmitz | |
| 5,772,147 A | 6/1998 | Stein | |
| 5,836,500 A | 11/1998 | Jourde | |
| 5,996,775 A | 12/1999 | Hendrickx | |
| 6,277,006 B1 | 8/2001 | Ghosh | |
| 6,379,290 B1 | 4/2002 | Sohl | |
| 6,393,249 B1 * | 5/2002 | Aslam et al. | 399/333 |
| 6,402,673 B1 | 6/2002 | Cyzycki | |
| 6,554,754 B2 | 4/2003 | VanRens | |
| 2002/0016241 A1 | 2/2002 | Vanrens | |
| 2005/0092440 A1 | 5/2005 | Lindsay | |
| 2005/0248077 A1 | 11/2005 | Tsai | |
| 2006/0005391 A1 | 1/2006 | Bomba | |
| 2006/0183613 A1 | 8/2006 | Niemeyer | |
| 2009/0218035 A1 | 9/2009 | Malterer | |

FOREIGN PATENT DOCUMENTS

| | | |
|---|---|---|
| DE | 19807857 | 8/1999 |
| DE | 100 18 418 | 10/2001 |
| GB | 264179 | 8/1927 |
| GB | 633545 | 12/1949 |
| GB | 998375 | 7/1965 |
| GB | 1098587 | 1/1968 |
| JP | 52-126379 | 10/1977 |
| JP | 60-101313 | 6/1985 |
| JP | 61-193954 | 8/1986 |
| JP | 62-215457 | 9/1987 |
| JP | 63-208465 | 8/1988 |
| JP | 05-237533 | 9/1993 |
| JP | 05-323815 | 12/1993 |
| JP | 06-071963 | 3/1994 |
| JP | 07-267451 | 10/1995 |
| JP | 09-141330 | 6/1997 |
| JP | 2001-002273 | 1/2001 |
| JP | 2002-234652 | 8/2002 |
| JP | 2007-039174 | 2/2007 |
| WO | WO 02/49833 | 6/2002 |
| WO | WO 2006/044271 | 4/2006 |

* cited by examiner

CONTACT NIP ROLL

CROSS REFERENCE TO RELATED APPLICATIONS

This application is a national stage filing under 35 U.S.C. 371 of PCT/US2010/052213, filed Oct. 12, 2010, which claims priority to U.S. Application No. 61/251,106, filed Oct. 13, 2009, the disclosure of which is incorporated by reference in their entirety herein.

BACKGROUND

Conventional web processing typically uses nip rolls to segregate portions of the web line that are under different tensions, such as in a length orienter where the web accelerates after the nip. As web travels through length orientating equipment, the web stretching process can create web caliper variation both across the width of the web, and downweb. Caliper variation is typically managed by using either a soft or hard nip roll. A soft nip surface can change the width of the contact area along the face of the roll. This variation can change the relative movement between the two rolls, resulting in web scuffing. In a similar manner, a harder nip surface can create a higher nip pressure only on the defect and/or thicker web caliper locations, and can cause significant differential web stress. Such web stress can propagate through the web path, resulting in web troughing, web wrinkling, and ultimately permanent web distortion.

SUMMARY

In one aspect, the present disclosure provides an improved contact nip roll that includes a shaft having an axis, a first compliant material in annular contact with the shaft, and a plurality of stacked annular rings. Each annular ring of the plurality of stacked annular rings includes an inner edge at least partially in contact with the first compliant material, and an outer edge concentric with the axis.

In another aspect, the present disclosure provides a method for assembling an improved contact nip roll that includes forming a first compliant material in annular contact on a shaft having an axis, and stacking a plurality of annular rings on the first compliant material. Each annular ring of the plurality of annular rings includes an inner edge at least partially in contact with the first compliant material, and an outer edge. The method for assembling an improved contact nip roll further includes applying pressure to compress the stack longitudinally, securing end plates to the shaft to maintain pressure on the stack and removing material from the outer edge of each of the plurality of annular rings, such that the outer edge becomes concentric with the axis.

In yet another aspect, the present disclosure provides a system for nipping a web that includes a nip roll, and a second roll disposed parallel to the nip roll and forming a nip line. The nip roll includes a shaft having an axis, a first compliant material in annular contact with the shaft, and a plurality of stacked annular rings. Each annular ring of the plurality of annular rings includes an inner edge at least partially in contact with the first compliant material, and an outer edge concentric with the axis. The second roll includes an outer surface displaced a uniform distance from the axis at the nip line, wherein a web contacting both the second roll and the outer edge of the plurality of annular rings is capable of radially displacing the outer edge of at least one of the plurality of stacked annular rings at the nip line.

In yet another aspect, the present disclosure provides a method for nipping a web that includes disposing a web between a nip roll and a second roll, and applying pressure to nip the web between the nip roll and the second roll. The second roll is disposed parallel to the nip roll and forms a nip line. The nip roll includes a shaft having an axis, a first compliant material in annular contact with the shaft, and a plurality of stacked annular rings. Each annular ring of the plurality of annular rings includes an inner edge at least partially in contact with the first compliant material, and an outer edge concentric with the axis. The second roll includes an outer surface displaced a uniform distance from the axis at the nip line, wherein the web radially displaces the outer edge of at least one of the plurality of stacked annular rings in the nip roll at the nip line.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

This application describes an improved contact nip roll that can provide an improved contact area between the improved contact nip roll and a contact roll in a nip. The improved contact nip roll can overcome the challenges associated with managing web caliper variations by providing a compensating, compliant nip surface. The improved contact nip roll integrates an inner softer core that can provide compliancy to web caliper variations, while rigid annular rings and a harder outer skin can maintain a uniform contact area.

The improved contact area can be essentially uniform regardless of any variation in caliper, or any defect present in web material. In one particular embodiment, the improved contact nip roll design includes an inner shaft, such as a metallic shaft, for example, aluminum or steel. The inner shaft is covered with a first compliant material, for example, a soft urethane material having a durometer of about 20. A plurality of annular rings, for example, stacked aluminum rings approximately 3/16 inches (4.76 mm) wide are disposed on the first compliant material, and a second compliant material, for example, a harder urethane skin having a durometer of about 80-90. The improved contact nip roll can be flexible and compliant, allowing pressure between the two rolls in a nip to remain approximately equal along the nip line of the rolls.

Conventional length orientation machines can use several rolls in multiple "S" wrap configurations to overcome problems with web distortion. Instead of this conventional approach, the improved contact nip roll more efficiently transports web, reducing the number of rolls needed in the orientation machines. Fewer rolls can provide cost savings including the need to purchase fewer rolls, less maintenance, and greatly improved web formation. In addition, post stretch and coating operations may no longer need "bumper rolls" (that is rolls taped on outer ends under web edges to increase roll diameter, and hence friction) because the improved contact nip roll can eliminate web stress differentials. The improved contact nip roll can improve both roll throughput yields (RTY) and final product quality.

Figure 1A:
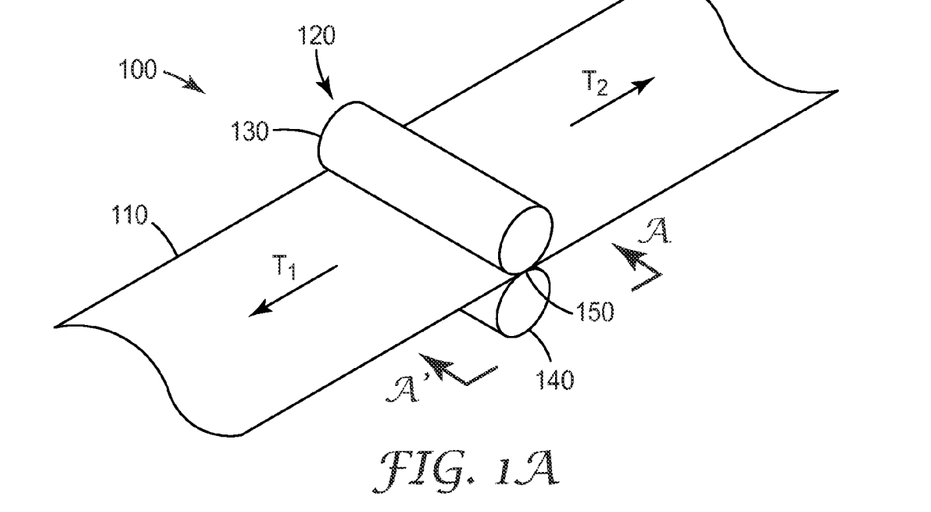
FIG. 1A is a perspective schematic view of a web line.

FIG. 1A is a perspective schematic view of a web line 100 in the vicinity of a nip 120, according to one aspect of the disclosure. In one particular embodiment, nip 120 can be used to separate regions of web 110 having different tensions, for example a first tension T1, and a second tension T2, where T2>T1. The difference in web tension can arise from, for example, a web length-orienter (LO). A web LO provides the second tension T2 to stretch the web 110 along the tension direction. The nip 120 separates web 110 undergoing the second tension T2, from the web 110 on the other side of the nip 120, where the web is fed into the nip 120 at a lower first tension T1, for example, from an extruder (not shown). Nip 120 includes a first nip roll 130, a second nip roll 140, and a nip line 150. The first and second nip rolls 130, 140 are forced together along the nip line 150, creating a nip pressure "P" on web 110 to prevent slippage through the nip line 150, thereby allowing the tension difference. The uniformity of web 110 can be affected by the uniformity of the nip pressure P along nip line 150.

Figure 1B:
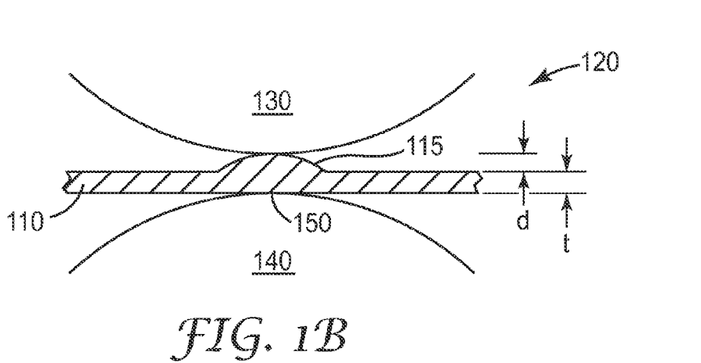
FIG. 1B is a cross-sectional schematic of nip point.

FIG. 1B is a cross-sectional schematic of nip point 120, along section A-A' of FIG. 1A, according to one aspect of the disclosure. In FIG. 1B, first nip roll 130 is separated from second nip roll 140 by a nominal web thickness "t" of web 110 and a defect 115 having a height "d" on the web 110. The presence of defect 115 can reduce the uniformity of the nip pressure P along the nip line 150. In one case, shown in FIG. 1B, both first and second nip rolls 130, 140 can be made from an inflexible material such as, for example, a metal. In this case, a region of web 110 without defect 115 could slip past the nip line 150 unless the nip pressure P were sufficient to prevent slippage of web 110 at the nominal web thickness "t". Such a pressure P would compress defect 115 as it passed through the nip line 150, creating a distortion or non-uniformity in the web 110.

Figure 1C:
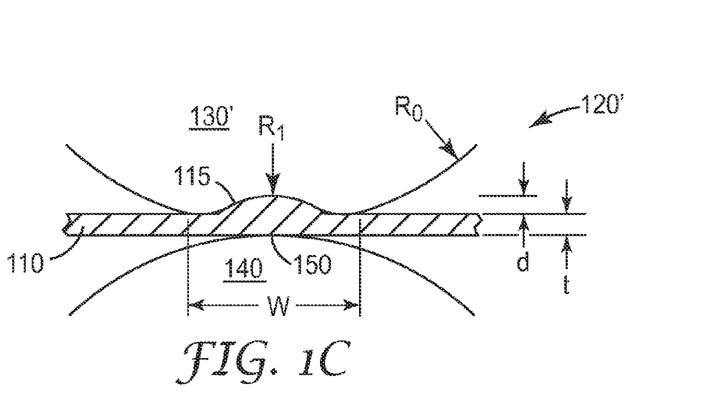
FIG. 1C is a cross-sectional schematic of nip point.

FIG. 1C is a cross-sectional schematic of nip point 120, along section A-A' of FIG. 1A, according to another aspect of the disclosure. In FIG. 1C, a first nip roll 130' is made from a compliant material that can deform sufficiently to accommodate the defect 115 without unduly increasing the nip pressure P along the nip line 150. The deformation of first nip roll 130' can change the contact width W along the nip line 150. The deformation of first nip roll 130' can also change the surface speed of the first nip roll, since a first radius $R_0$ of the first nip roll 130' is decreased to a second radius $R_1$. This change in surface speed can cause a shearing force to be generated in the vicinity of defect 115, creating a distortion or non-uniformity in the web 110.

Figure 2:
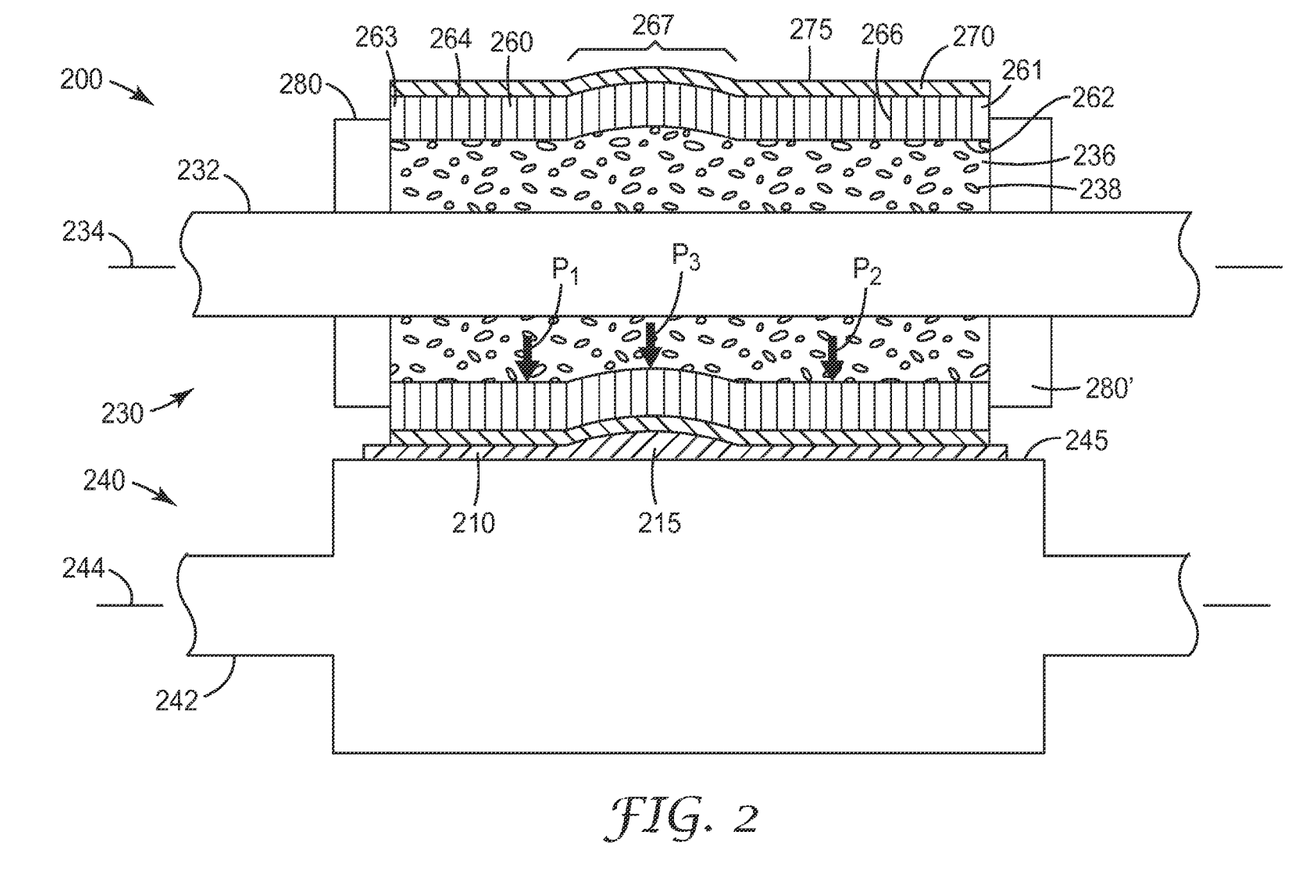
FIG. 2 is a cross-sectional schematic of a nip.

FIG. 2 is a cross-sectional schematic of a nip 200 along the nip line 150 of FIG. 1A, according to one aspect of the disclosure. Nip 200 includes an improved contact nip roll 230 having a center shaft 232 having a first longitudinal axis 234. A first compliant material 236 is in annular contact with the shaft 232. The first compliant material 236 can be any material that has a relatively low modulus, including, for example, a rubber such as butyl rubber or ethylene propylene diene monomer (EPDM) rubber; a silicone such as silicone rubber; a copolymer such as styrene butadiene styrene (SBS) block copolymer or styrene butadiene ethylene styrene (SEBS) block copolymer; a polyurethane; and the like.

In one particular embodiment, the first compliant material 236 can optionally include a plurality of voids 238, such as a plurality of bubbles formed within the first compliant material 236. In some cases, the plurality of voids 238 can instead be channels that are cut, drilled, laser etched, ablated, or otherwise formed in the first compliant material 236, as described elsewhere with reference to FIGS. 3A-3C. Generally, the plurality of voids 238 can deform more readily than the compliant material, to accommodate pressures imposed on the first compliant material 236.

A plurality of annular rings 260 are stacked together along surfaces 266. Each annular ring 260 includes an inner edge 262 at least partially in contact with the first compliant material 236 and an outer edge 264 concentric with the first longitudinal axis 234. Representative geometries of each annular ring 260 are described elsewhere with reference to FIGS. 4A-4D.

Each annular ring 260 has a modulus that is greater than the modulus of the first compliant material 236. In one particular embodiment, each annular ring 260 can be fabricated from a metal such as aluminum or steel; a metal alloy such as copper or brass; an engineering plastic or a rigid plastic such as acrylonitrile butadiene styrene (ABS), polycarbonate, Teflon®, or Delrin®; or composite materials such as fiber reinforced plastic (FRP); and the like. In one particular embodiment (not shown), a material, such as a polymeric material, can be disposed between adjacent annular rings 260 along surfaces 266, to provide a low sliding friction, as described elsewhere. In some cases, the polymeric material can include polytetrafluoroethylene (PTFE) and the like.

A first end plate 280 and a second end plate 280' are secured to the shaft 232, and are adjacent to a first outer annular ring 263 and a second outer annular ring 261, respectively. In one particular embodiment, the first and second end plate 280, 280' are in contact with the first and second outer annular ring 263, 261, respectively. In some cases, the first and second end plate 280, 280' provide a longitudinal force (that is, a force parallel to the first longitudinal axis 234) that forces the plurality of annular rings 260 together. The magnitude of the longitudinal force can be adjusted to provide any desired ease of sliding motion of the annular rings 260 along the surface 266.

A second compliant material 270 is in contact with the outer edge 264 of each of the annular rings 260. The second compliant material 270 can be any material that has a relatively low modulus, including, for example, the same materials used for first compliant material 236. In one particular embodiment, the second compliant material 270 can have a modulus that is greater than the modulus of the first compliant material. In one particular embodiment, the second compliant material 270 can be polyurethane. The second compliant material 270 can be a thin coating, for example, less than 4 mm thick, less than 3 mm thick, less than 2 mm thick, less than 1 mm thick, or less than 500 microns thick. Generally, the second compliant material 270 includes an improved contact nip roll outer surface 275 that has a coefficient sufficient to reduce slippage of a web 210 in contact with the improved contact nip roll outer surface 275.

In one particular embodiment, the second compliant material 270 can form a continuous coating over the plurality of annular rings 260. In this case, the second compliant material 270 can be coated on the plurality of annular rings 260 after application of the longitudinal force provided by the first and second end plates 280, 280'. In one particular embodiment, the second compliant material 270 can be coated individually on the outer edge 264 of each annular ring 260, as described elsewhere.

Returning to FIG. 2, nip 200 further includes a second nip roll 240 having a second shaft 242, a second longitudinal axis 244 generally parallel to the first longitudinal axis 234, and second nip roll outer surface 245. The web 210 having a defect 215 is nipped between the improved contact nip roll outer surface 275 and the second nip roll outer surface 245. As shown in FIG. 2, the defect 215 causes a displaced portion 267 of the annular rings 260 to move relative to the first longitudinal axis 234, compressing the first compliant material 236. A first and a second pressure, $P_1, P_2$ (outside of the displaced portion 267), and a third pressure, $P_3$ (within the displaced portion 267) is exerted by the first compliant material 236 through the annular rings 260 and the second compliant material 270 to the web 210. The relative movement of the annular rings 260 and compression of the first compliant material 236 within the displaced portion 267 can reduce a variation in the first, second, and third pressures $P_1, P_2, P_3$, thereby reducing the stress on defect 215, and can reduce any distortion or non-uniformity caused by prior art nip rolls, as described elsewhere.

Figure 3A:
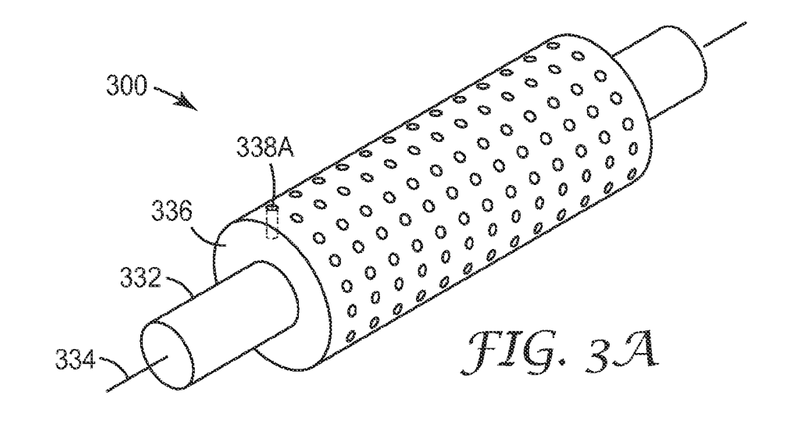
FIGS. 3A-3C are perspective schematics of a portion of an improved contact nip roll.
Figure 3B:
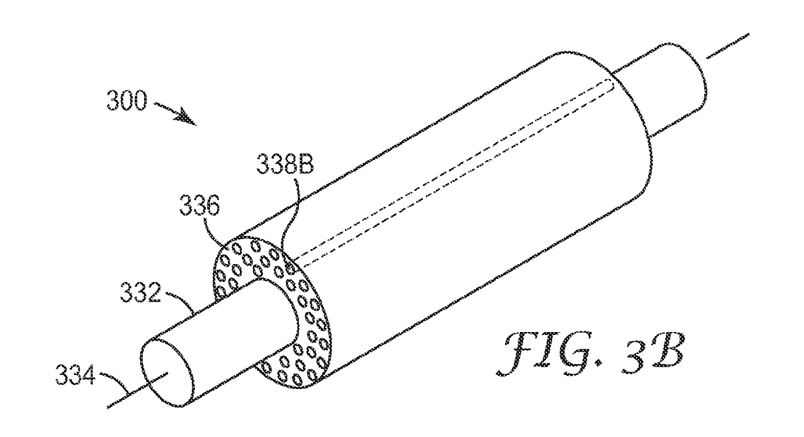
Figure 3C:
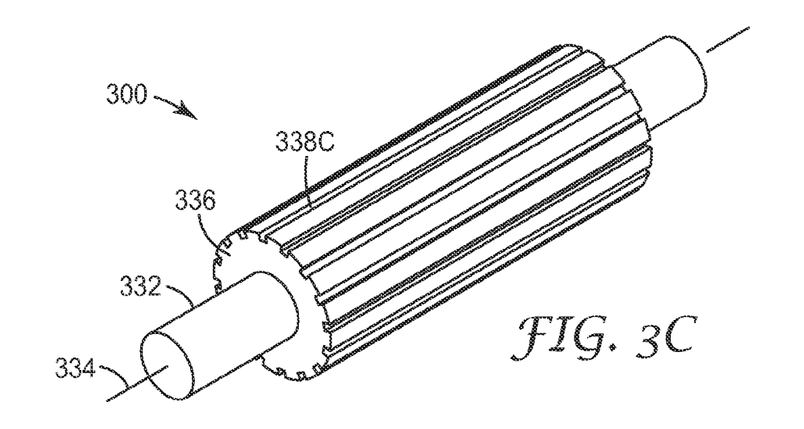

FIGS. 3A-3C are perspective schematics of a portion of an improved contact nip roll 300 having a plurality of voids 338A-338C in first compliant material 336, according to different aspects of the disclosure. The portion of the improved contact nip roll 300 includes first compliant material 336 in annular contact with a shaft 332 having a first longitudinal axis 334.

In FIG. 3A, a plurality of radial holes 338A are formed in first compliant material 336. In one particular embodiment, each of the plurality of radial holes 338A can have a cross-section that can be any shape including, for example, a circle, an oval, a square, a triangular, any random shape, or a combination thereof. The plurality of radial holes 338A can be uniformly or non-uniformly distributed throughout the first compliant material 236. Each of the plurality of radial holes 338A can be formed by any known technique including, for example, drilling, laser drilling, plunge cutting, machining, ablating, molding, and the like.

In FIG. 3B, a plurality of longitudinal holes 338B are formed in first compliant material 336. In one particular embodiment, each of the plurality of longitudinal holes 338B can have a cross-section that can be any shape including, for example, a circle, an oval, a square, a triangular, any random shape, or a combination thereof. The plurality of longitudinal holes 338B can be uniformly or non-uniformly distributed throughout the first compliant material 236. Each of the plurality of longitudinal holes 338B can be formed by any known technique including, for example, drilling, laser drilling, plunge cutting, machining, ablating, molding, and the like.

In FIG. 3C, a plurality of longitudinal channels 338C are formed in first compliant material 336. In one particular embodiment, each of the plurality of longitudinal channels 338C can have a cross-section that can be any shape including, for example, a portion of a circle, an oval, a square, a triangular, any random shape, or a combination thereof. The plurality of longitudinal channels 338C can be uniformly or non-uniformly distributed throughout the first compliant material 236. Each of the plurality of longitudinal channels 338C can be formed by any known technique including, for example, drilling, laser drilling, plunge cutting, machining, ablating, molding, and the like.

The particular embodiments shown in FIGS. 3A-3C are not meant to be all-inclusive of the variety of the plurality of voids 238 that can be created in first compliant material 236. For example, any combination of holes and channels described above can be used, as well as any other contemplated techniques for creating voids in a material including spirals, slots, cuts, surface structures such as pyramids and cylinders, and the like.

Figure 4A:
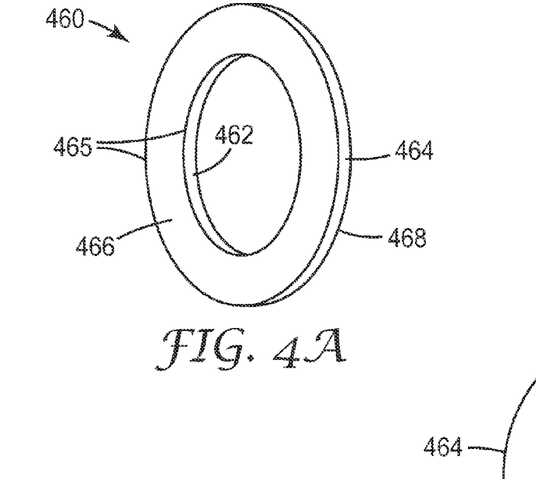
FIG. 4A is a schematic perspective view of an annular ring.

FIG. 4A is a schematic perspective view of an annular ring 460, according to an aspect of the disclosure. In FIG. 4A, the annular ring 460 includes an inner edge 462, and outer edge 464, a first face 466 between the inner and outer edge (462, 464), and a second face 468 opposite the first face 466. The annular ring 460 can be fabricated using any suitable technique, including, for example, stamping, laser or machine cutting, molding, casting, and the like, depending on the type of material used for the annular ring 460. Annular ring 460 further includes a corner edge 465 between each of the inner and outer edge (462, 464), and the first and second faces (466, 468).

In one particular embodiment, each of the corner edges 465 can be beveled or chamfered to reduce or remove any burrs formed during the fabrication process. In some cases, a surface coating can be applied to at least one of the first face 466 and second face 468. The surface coating, if applied, can be used to control the sliding friction between adjacent annular rings 260, as described for the improved contact nip roll 230 of FIG. 2. In some cases, the surface coating can be PTFE, boron nitride, aluminum nitride, nickel, or the like, or a combination thereof.

Figure 4B:
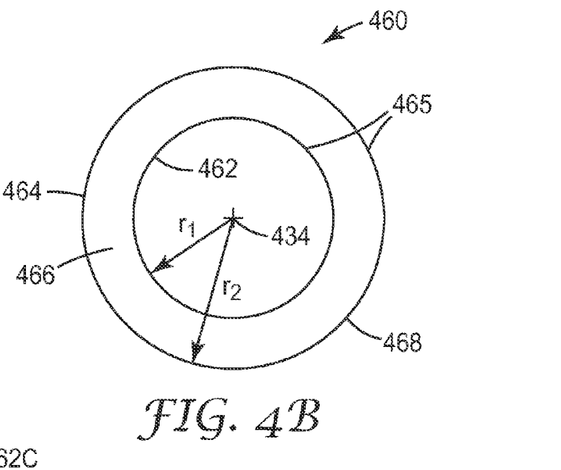
FIGS. 4B-4D are schematic top views of an annular ring.

FIG. 4B is a schematic top view of an annular ring 460 according one aspect of the disclosure. Each of the elements 460-468 shown in FIG. 4B correspond to like-numbered elements 460-468 shown in FIG. 4A, which have been described previously. For example, the description of inner edge 462 in FIG. 4A corresponds to the description of inner edge 462 in FIG. 4B, and so on. In FIG. 4B, the inner edge 462 has an inner radius $r_1$ and the outer edge 464 has an outer radius $r_2$, measured from a longitudinal axis 434 (similar to the first longitudinal axis 234 shown in FIG. 2). Outer radius $r_2$ is concentric with the longitudinal axis 434, as described elsewhere, forming a circle. In some cases, inner radius $r_1$ can also be concentric with the longitudinal axis 434. In some cases, inner radius $r_1$ can vary from a circular shape, and not be concentric with the longitudinal axis 434, as described elsewhere. In one particular embodiment, the difference in the radii $(r_2-r_1)$ is a relatively small fraction of the outer radius $r_2$, for example, $(r_2-r_1)/r_2$ can be less than about 0.25, less than about 0.20, less than about 0.15, less than about 0.10, or less than about 0.05.

Figure 4C:
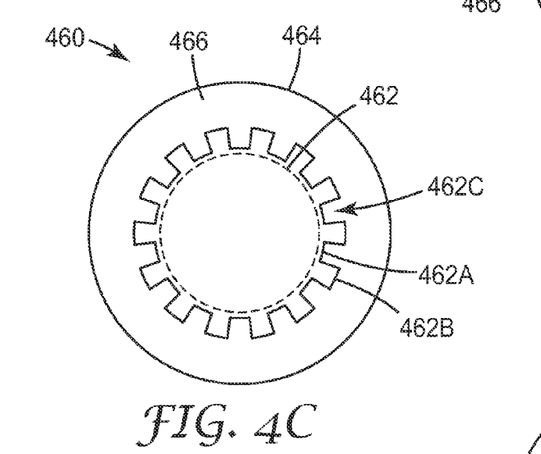

FIG. 4C is a schematic top view of an annular ring 460 according one aspect of the disclosure. Each of the elements 460-468 shown in FIG. 4C correspond to like-numbered elements 460-468 shown in FIG. 4A, which have been described previously. For example, the description of inner edge 462 in FIG. 4A corresponds to the description of inner edge 462 in FIG. 4C, and so on. In FIG. 4C, inner edge 462 is replaced by a first inner edge 462A and a second inner edge 462B that form a spline 462C on inner edge 462. The annular ring 460 shown in FIG. 4C can be used, for example, with the first compliant material 236 of FIG. 2, to allow the first compliant material 236 to compress without including the optional voids 238. In one particular embodiment, the first inner edge 462A can be in contact with the first compliant material 236, and the compression that results from a defect can cause the first compliant material 236 to "ooze" into the space between the splines 462C, relieving some of the compressive pressure. It is to be understood that the spline configuration shown in FIG. 4C is merely representative of many contemplated variations of the inner edge 462, which can include, for example: a wavy structure such as a sine wave; a series of regular or irregular protrusions such as posts, rods, triangles, trapezoids, or pyramids; or any other structure which can provide partial contact of the inner edge 462 with the first compliant material.

Figure 4D:
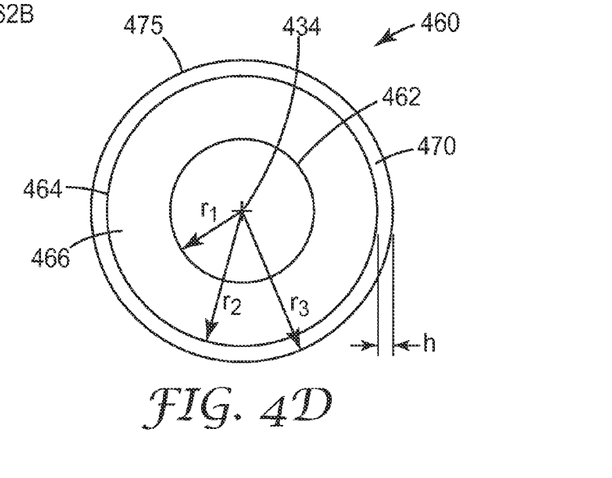

FIG. 4D is a schematic top view of an annular ring 460 according one aspect of the disclosure. Each of the elements 460-468 shown in FIG. 4D correspond to like-numbered elements 460-468 shown in FIG. 4B, which have been described previously. For example, the description of inner edge 462 in FIG. 4B corresponds to the description of inner edge 462 in FIG. 4D, and so on. In one particular embodiment, FIG. 4D shows the annular ring 460 having a second compliant material 470 in contact with the outer edge 464 prior to assembling the plurality of annular rings 260 shown in FIG. 2. In FIG. 4D, the inner edge 462 has an inner radius $r_1$, the outer edge 464 has an outer radius $r_2$, and the second compliant material 470 has an outer edge 475 with a surface radius $r_3$, all measured from a longitudinal axis 434 (similar to the first longitudinal axis 234 shown in FIG. 2). Outer radius $r_2$ is concentric with the longitudinal axis 434, as described elsewhere, forming a circle. In some cases, inner radius $r_1$ can also be concentric with the longitudinal axis 434. In some cases, inner radius $r_1$ can vary from a circular shape, and not be concentric with the longitudinal axis 434, as described elsewhere.

In one particular embodiment, the difference in the radii $(r_2-r_1)$ is a relatively small fraction of the outer radius $r_2$, for example, $(r_2-r_1)/r_2$ can be less than about 0.25, less than about 0.20, less than about 0.15, less than about 0.10, or less than about 0.05. In one particular embodiment, the difference in the radii $(r_3-r_2)$, that is, the thickness "h" of the second compliant material 470, is a relatively small fraction of the difference in the radii $(r_2-r_1)$. For example, $(r_3-r_2)/(r_2-r_1)$ can be less than about 0.25, less than about 0.20, less than about 0.15, less than about 0.10, or less than about 0.05.

FIGS. 5A-5E shows a perspective fabrication schematic of an improved contact nip roll 530, according to one aspect of the disclosure. Each of the elements 530-580 shown in FIGS. 5A-5E correspond to like-numbered elements 230-280 shown in FIG. 2, which have been described previously. For example, the description of shaft 232 in FIG. 2 corresponds to the description of shaft 532 in FIG. 5A, and so on.

Figure 5A:
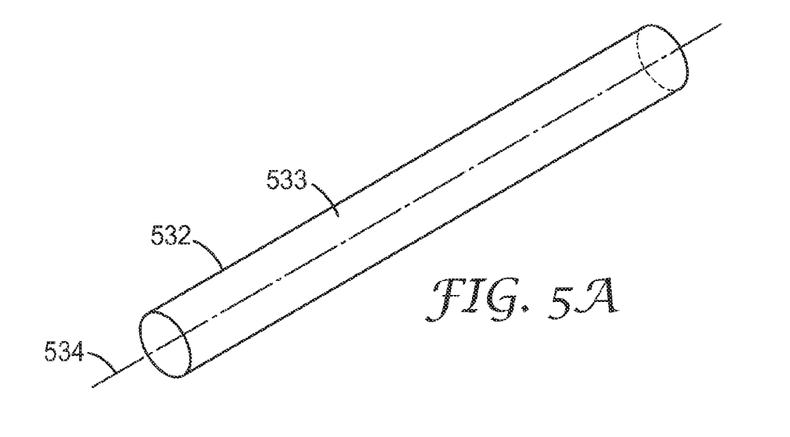
FIGS. 5A-5E shows a perspective fabrication schematic of an improved contact nip roll.
Figure 5B:
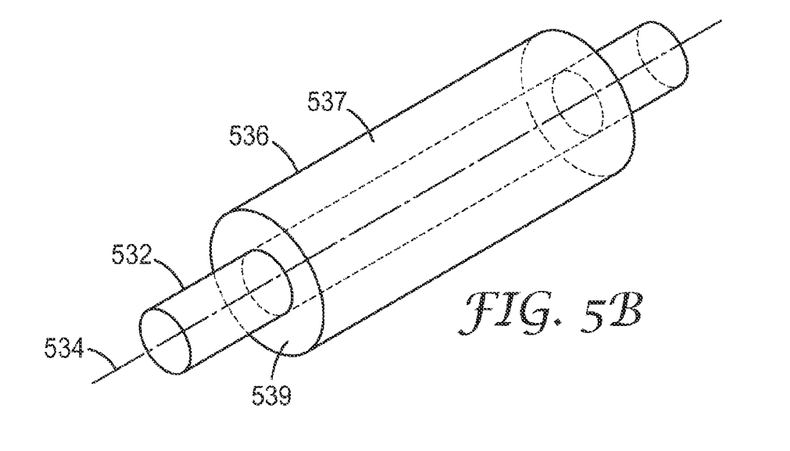

FIG. 5A shows a shaft 532 having a longitudinal axis 534 and a shaft outer surface 533. FIG. 5B shows a first compliant material 536 having an end 539 and a first compliant material surface 537 disposed in contact with the shaft outer surface 533. The first compliant material can be disposed in contact with the shaft outer surface 533 by any known roll-making technique, including, for example, molding, and the first compliant material surface 537 can be made concentric with the longitudinal axis 534 by known techniques including grinding. A plurality of voids (not shown) can be formed in first compliant material 536 as described elsewhere.

Figure 5C:
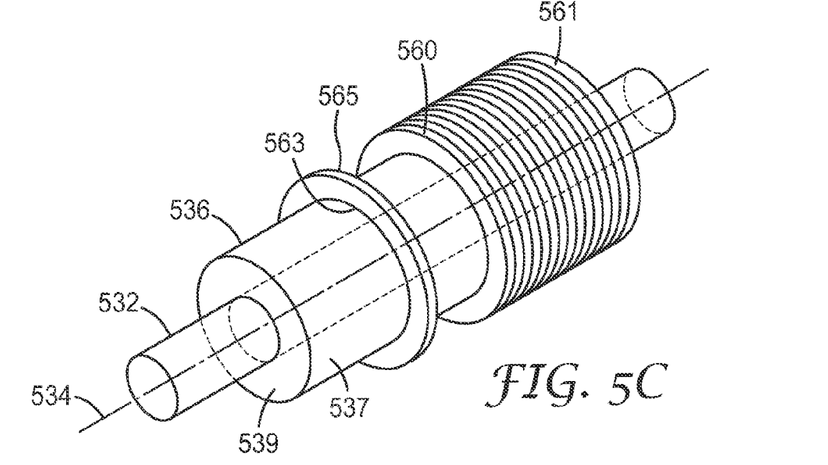

FIG. 5C shows a first outer annular ring 561 of a plurality of annular rings 560, stacked in at least partial contact with the first compliant material 536. Each of the annular rings 560 can be sized such that interference fit 563 is maintained as the annular ring is positioned in the stack. In one particular embodiment, a corner edge 565 can be beveled or chamfered to provide a non-binding contact between rings in the stack.

Figure 5D:
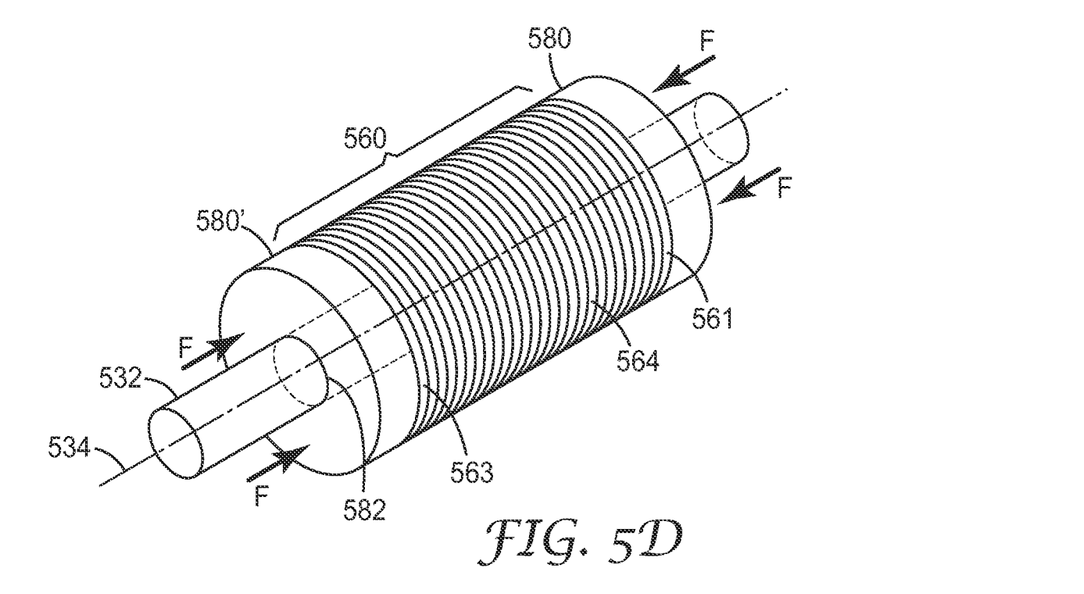

FIG. 5D shows a first end plate 580 adjacent to the first outer annular ring 561, the plurality of stacked annular rings 560, and a second end plate 580' adjacent to the second outer annular ring 563. A longitudinal force F is applied to compress the plurality of annular rings 560 together, and the end plates are secured to the shaft 532 along contact line 582. The shaft 532 can be secured along the contact line 582 by any technique, including, for example, a screw, a set screw, a weld, a clamp collar, and the like. An outer edge 564 of the plurality of annular rings 560 can be made concentric with the longitudinal axis 534 after the rings are compressed together, by any known technique, including, for example, grinding, milling, and the like.

Figure 5E:
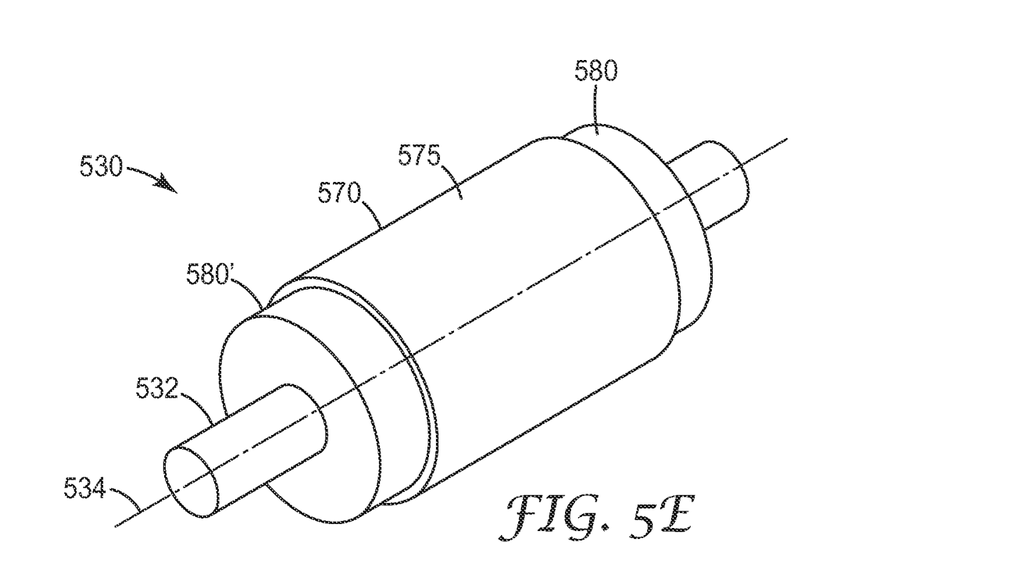

FIG. 5E shows an improved contact nip roll 530 according to one aspect of the disclosure. In FIG. 5E, a second compliant coating 570 having a second compliant coating surface 575, is disposed on the plurality of annular rings 560. The second compliant coating can be applied, and can be made concentric with the longitudinal axis 534 by any known technique, as described elsewhere.

EXAMPLES

Example 1

Fabrication of an Improved Contact Nip Roll

Into each end of a 24" long aluminum tube with an outside diameter of 3.50 inches (8.89 cm) and an inside diameter of 2.00 inches (5.08 cm) were machined bearing bores 2.626 inches (6.670 cm) diameter by 0.4375 inches (1.111 cm) deep for a bearing that will accept a 1.50 inch (3.81 cm) diameter shaft. The outside diameter of the tube was machined to be concentric with the inside diameter of the bearing bores. A quantity of six #10-32 tapped holes equally spaced on a 3.125 inch (7.937 cm) diameter bolt circle were added to each end of the tube.

A first compliant layer was coated on the tube. The first compliant material was an elastomeric coating 0.75 inch (1.91 cm) thick of 30 durometer neoprene rubber applied by S.I. Industries, Inc., Blaine, Minn., to the outside of the tube. A plurality of annular rings (similar to those shown in FIGS. 4A-4B) having an inside diameter of 5 inches (12.7 cm) and an outside diameter of 6 inches (15.24 cm) were laser cut from sheets of aluminum 0.188 inches (0.478 cm) thick. The edges of the annular rings were deburred by hand using emery paper and a deburring tool, until any pair of stacked rings slid smoothly against one another. Each annular ring was then coated with a Teflon impregnated hardcoat anodizing (applied by Twin City Plating, Minneapolis, Minn.), to improve their mutual lubricity.

The inside diameters of the coated rings were precisely measured, and the elastomeric coating was ground down until the outside diameter of the elastomer coated aluminum tube was 0.001 inch (0.0254 mm) greater than the inside diameters of the annular rings. A grid pattern of holes was then drilled into the elastomeric coating (similar to those shown in FIG. 3A). The holes were 0.125 inch (0.318 cm) in diameter, and were spaced 0.50 inch (1.27 cm) apart in the circumferential direction and 0.50 inch (1.27 cm) apart in the axial direction. The holes were drilled to a depth of 0.62 inch (1.57 cm).

Aluminum end caps were fabricated for each end of the tube, each end cap having an outside diameter equal to that of the coated annular rings. A hole was machined in the center of each end cap for the shaft bearing clearance. Clearance holes were machined into each end cap such that the pattern of these holes matched the pattern of the #10-32 tapped holes previously machined into the ends of the tube. One end cap was attached to one end of the tube, and firmly secured using appropriately threaded screws. A small amount of soapy water was applied as a lubricant to the surface of the elastomeric coating to aid assembly.

The coated annular rings were urged onto the elastomer-coated tube. The slightly larger outside diameter of the elastomer-coated tube, compared to the inside diameter of the coated annular rings, resulted in a snug interference fit. Each annular ring was urged onto the coated tube until it came in full contact with the annular ring installed before it. The last of the annular rings applied was machined down so as to be flush with the end of the aluminum tube. The second end cap was then attached to that end of the tube, and secured with appropriately threaded screws.

The outside surface of the assembled roll was then ground smooth, taking care to ensure that the outside diameter was concentric with the bearing bores. The resulting partially completed nip roll (including the plurality of annular rings but without the second compliant material) was similar to the fabrication schematic shown in FIG. 5D. This partially completed nip roll was tested in Example 2 below.

A second compliant elastomeric layer of 80 durometer urethane was then applied to the partial roll (by S.I. Industries, Inc., Blaine, Minn.) at a thickness of 0.25 inch (0.635 cm) to the outer surface of the assembled roll. The urethane coated roll was then ground again to make it smooth and bring the thickness of the second compliant elastomeric layer to 0.125 inch (0.318 cm) thickness, taking care that the outside diameter was concentric with the bearing bores. The bearings and shaft were then added to the improved contact nip roll, and clamp collars were added to the shaft to keep the roll from sliding on the shaft.

Example 2

Simulation of Improved Contact Nip Roll

A simulated improved contact nip roll was shown to minimize the amount of cross web contact and pressure variations caused by a change in web caliper. Several different nip pressures and web calipers were tested, and show that the improved contact nip roll produced less contact area variation.

A 0.125 inch (0.3175 cm) thick sheet of 80 durometer urethane was wrapped around the partially completed nip roll of Example 1 to simulate a second compliant material coating. This simulated improved contact nip roll was set in fixed bearing housings, and a pivoting 4 inch (10.16 cm) diameter aluminum nip roll was actuated by two 3.25 inch (8.255 cm) bore pneumatic cylinders to apply a nip force between the two rolls. The pressure was released, and a sheet of cast polyethylene terephthalate (PET), having a caliper which varied from 0.030 inch (0.762 mm) to 0.062 inch (1.575 mm), was inserted between the two rolls. The aluminum nip roll was actuated using air pressures of 50 psi in the pneumatic cylinders.

Figure 6:
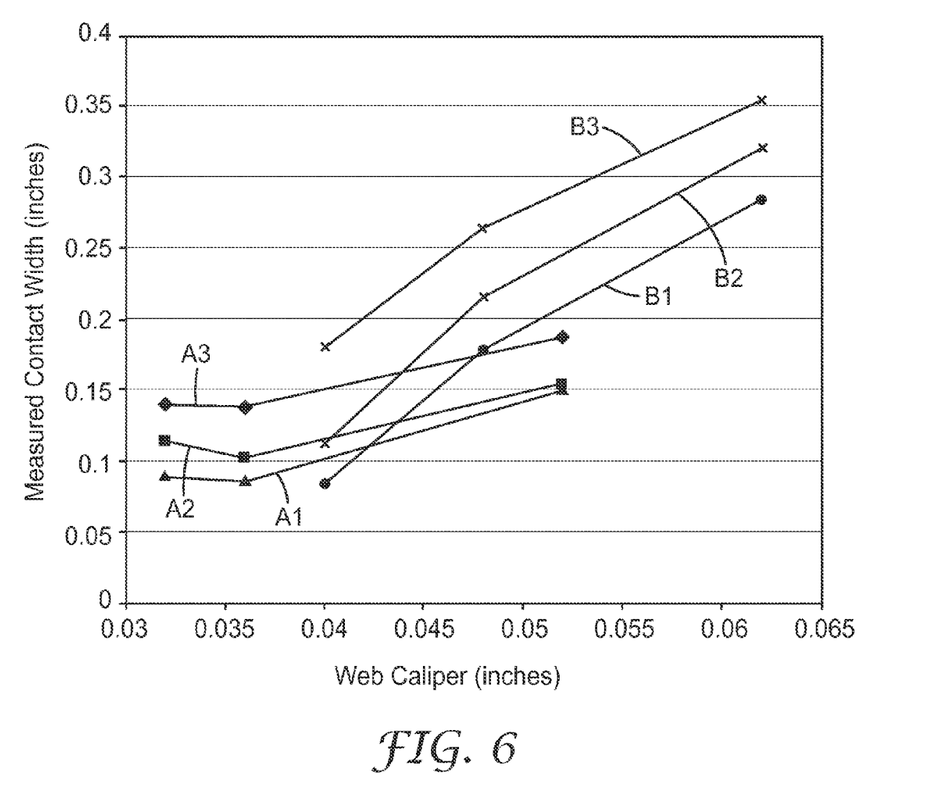
FIG. 6 shows a graph of Measured Contact Width versus Web Caliper.

FIG. 6 shows a graph of Measured Contact Width versus Web Caliper for both a simulated improved contact nip roll and a conventional nip roll. A P-Nip Sensor (available from Sensor Products, Inc. Madison, N.J.) was used to measure the length (that is, the Measured Contact Width shown in FIG. 6) in the circumferential direction of nip contact for the system of the two rolls with polyester film between them. The sensor was moved to different positions along the film (each position having a known Web Caliper, shown in FIG. 6) while the system remained under constant pneumatic pressure. The procedure was then repeated using a conventional 4 inch (10.16 cm) diameter nip roll in place of the simulated improved contact nip roll.

The Measured Contact Width versus Web Caliper at 50, 60, and 90 psi was measured for the simulated improved contact nip roll and was plotted as lines A1, A2, and A3, respectively. The Measured Contact Width versus Web Caliper at 50, 60, and 90 psi was measured for the conventional nip roll and was plotted as lines B1, B2, and B3, respectively. The data show that the variation in the contact length in the circumferential direction with caliper is smaller at all pressures for the simulated improved contact nip roll than for the conventional nip roll.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A contact nip roll, comprising:
   a shaft having an axis, wherein the shaft passes through a first end plate on a first end of the shaft and a second end plate on a second end of the shaft opposite the first end thereof, and wherein each of the first and the second end plates are secured to and in direct contact with the shaft,
   a first compliant material, having a first Young's modulus, in annular contact with the shaft and between the first end plate and the second end plate;
   a plurality of stacked annular rings stacked together along surfaces normal to the axis of the shaft and arranged between the first end plate and the second end plate, wherein the annular rings have a Young's modulus greater than the Young's modulus of the first compliant material, each annular ring comprising:
   an inner edge at least partially in contact with the first compliant material; and
   an outer edge concentric with the axis; and
   wherein the plurality of stacked annular rings comprise a first outer annular ring in contact with the first end plate, and a second outer annular ring in contact with the second end plate, respectively, and wherein the first and second end plates maintain a longitudinal force parallel to the axis of the shaft to compress together the plurality of annular rings.

2. The contact nip roll of claim 1, further comprising a second compliant material, having a second Young's modulus, in contact with the outer edge of each of the plurality of stacked annular rings.

3. The contact nip roll of claim 2, wherein the second Young's modulus is greater than the first Young's modulus.

4. The contact nip roll of claim 2, wherein the second compliant material is a continuous coating contacting each of the outer edges.

5. The contact nip roll of claim 1, wherein the first compliant material further comprises a plurality of voids.

6. The contact nip roll of claim 5, wherein the plurality of voids comprise a plurality of radial voids, longitudinal voids, internal voids, or a combination thereof.

7. The contact nip roll of claim 5, wherein the plurality of voids comprise cylindrical voids.

8. The contact nip roll of claim 5, wherein at least a portion of the plurality of voids intersect an outer surface of the first compliant material.

9. The contact nip roll of claim 1, wherein at least a portion of the inner edge is concentric with the axis.

10. The contact nip roll of claim 1, wherein at least one of the inner edge and the outer edge is chamfered.

11. The contact nip roll of claim 1, wherein each of the plurality of stacked rigid annular rings comprise a first face between the inner and outer edges, and a second face opposite the first face, wherein each of the first and second faces are smoothed and deburred.

12. The contact nip roll of claim 11, further comprising a surface coating on each of the first and second faces.

13. The contact nip roll of claim 12, wherein the surface coating comprises polytetrafluoroethylene, boron nitride, aluminum nitride, nickel, or a combination thereof.

14. The contact nip roll of claim 1, wherein the first compliant material comprises rubber, silicone, polyurethane, or a combination thereof.

15. The contact nip roll of claim 2, wherein each of the plurality of annular rings comprise a third material having a third Young's modulus that is greater than the second Young's modulus.

16. The contact nip roll of claim 1, wherein each of the plurality of annular rings comprise a metal.

17. A system for nipping a web, comprising:
a nip roll, comprising:
a shaft having an axis; wherein the shaft passes through a first end plate on a first end of the shaft and a second end plate on a second end of the shaft opposite the first end thereof, and wherein each of the first and the second end plates are secured to and in direct contact with the shaft,
a first compliant material having a first Young's modulus, wherein the first compliant material is in annular contact with the shaft and between the first end plate and the second end plate;
a plurality of stacked annular rings stacked together along surfaces normal to the axis of the shaft and arranged between the first end plate and the second end plate, wherein the annular rings have a Young's modulus greater than the Young's modulus of the first compliant material, each annular ring comprising:
an inner edge at least partially in contact with the first compliant material;
an outer edge concentric with the axis; and
wherein the plurality of stacked annular rings comprise a first outer annular ring in contact with the first end plate, and a second outer annular ring in contact with the second end plate, respectively, and wherein the first and second end plates maintain a longitudinal force parallel to the axis of the shaft to compress together the plurality of annular rings; and
a second roll disposed parallel to the nip roll and forming a nip line, the second roll having an outer surface displaced a uniform distance from the axis at the nip line, wherein a web contacting both the second roll and the outer edge of the plurality of rigid annular rings is capable of radially displacing the outer edge of at least one of the plurality of stacked rigid annular rings at the nip line.

18. The system of claim 17, further comprising a second compliant material in contact with the outer edge of each of the plurality of stacked rigid annular rings.

19. The system of claim 18, wherein the second compliant material is a continuous coating contacting each of the outer edges.

20. The system of claim 17, wherein at least a portion of the inner edge is concentric with the axis.

21. The system of claim 17, wherein at least one of the inner edge and the outer edge is chamfered.

22. The system of claim 17, wherein each of the plurality of stacked annular rings comprise a first face between the inner and outer edges, and a second face opposite the first face, wherein each of the first and second faces are smoothed and deburred.

23. The system of claim 22, further comprising a surface coating on each of the first and second faces.

24. The system of claim 23, wherein the surface coating comprises polytetrafluoroethylene, boron nitride, aluminum nitride, nickel, or a combination thereof.

25. The system of claim 17, wherein the first compliant material comprises rubber, silicone, polyurethane, or a combination thereof.

26. The system of claim 17, wherein each of the plurality of annular rings comprise a metal.

27. The system of claim 17, wherein each annular ring is in direct contact with a next adjacent annular ring.

28. The system of claim 17, further comprising a material disposed between adjacent annular rings of the plurality of stacked annular rings to provide a low sliding friction between the adjacent annular rings.

29. The contact nip roll of claim 1, wherein each annular ring is in direct contact with a next adjacent annular ring.

30. The contact nip roll of claim 1, further comprising a material disposed between adjacent annular rings of the plurality of stacked rigid annular rings to provide a low sliding friction between the adjacent rigid annular rings.

* * * * *